United States Patent [19]
Mikeska

[11] 3,771,726
[45] Nov. 13, 1973

[54] FREE-FLOATING ROCKET NOZZLE INSERT

[75] Inventor: Alan J. Mikeska, Annandale, Va.

[73] Assignee: The United States of America as represented by the Secretary of The United States Air Force, Washington, D.C.

[22] Filed: May 11, 1970

[21] Appl. No.: 48,760

[52] U.S. Cl. ............................................ 239/265.11
[51] Int. Cl. ............................................. B63h 11/00
[58] Field of Search ...................... 239/127.1, 127.3, 239/265.11

[56] References Cited
UNITED STATES PATENTS
3,305,178  2/1967  Parilla ............................ 239/132.5
3,309,026  3/1967  Loprete ................................ 60/260

*Primary Examiner*—Samuel Feinberg
*Attorney*—Harry A. Herbert, Jr. and Arsen Tashjian

[57] ABSTRACT

A method of mounting a pyrolytic graphite coated rocket nozzle insert in a composite-type rocket nozzle to prevent failure of the nozzle insert by cracking and delamination of the pyrolytic graphite coating which is solely on the internal surface of the insert. The method includes the steps of forming a circumferential groove in the uncoated entrance and face surface and in the uncoated exit end face surface of the pyrolytic graphite coated insert; forming an annular slot in the longitudinal internal surface of the insert which is next adjacent to the uncoated longitudinal surface of the pyrolytic graphite coated insert; coating, with a layer of silicon grease, the surfaces, except the pyrolytic coated surface, of the pyrolytic coated insert; seating an O-ring within the annular slot; and, positioning the pyrolytic graphite coated insert in its proper place in the composite-type rocket nozzle. The pyrolytic graphite coated insert is, thereby, in a free-floating condition, and cracking and delamination of the pyrolytic graphite coating is prevented.

1 Claim, 1 Drawing Figure

PATENTED NOV 13 1973
3,771,726
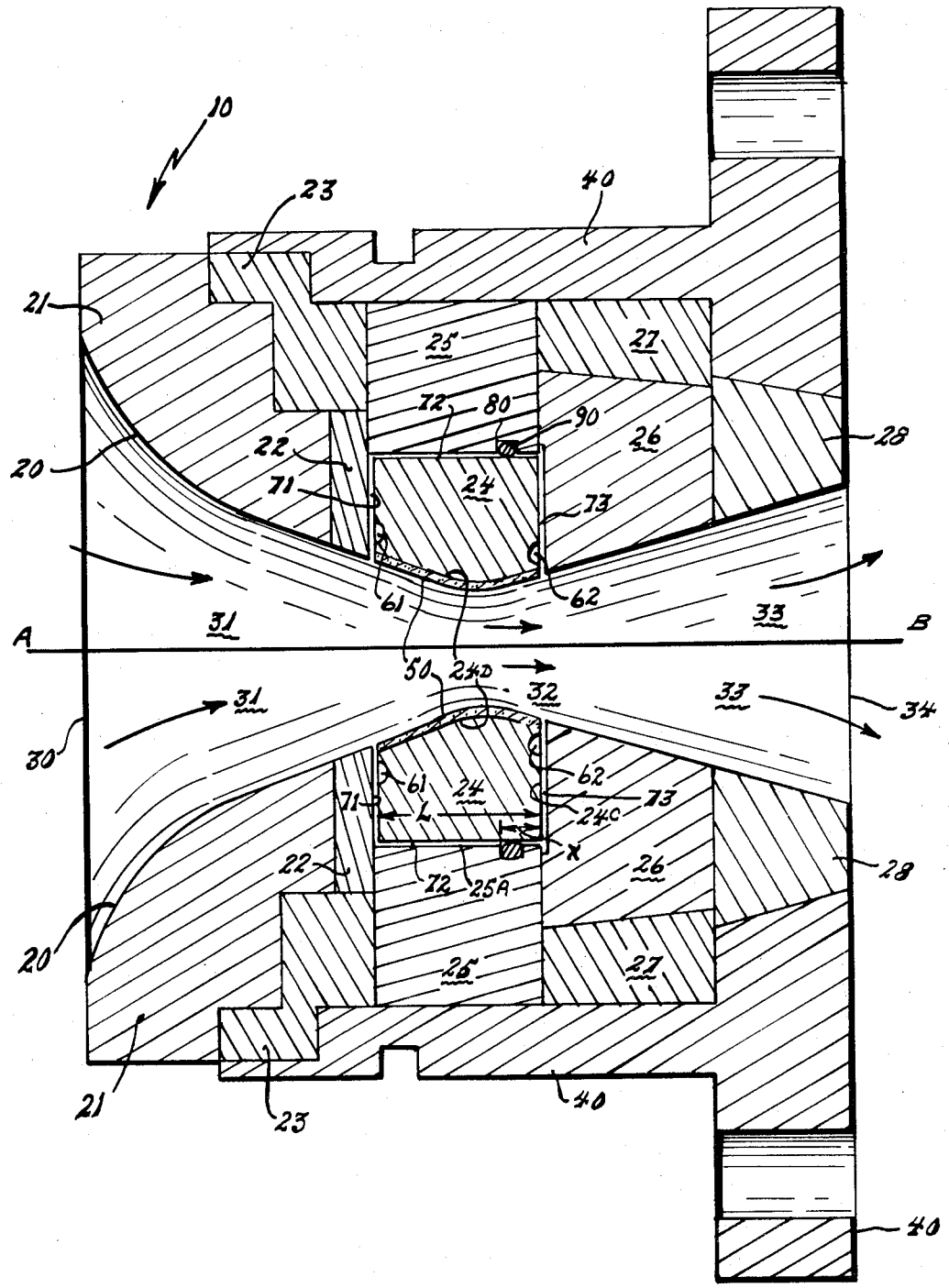
INVENTOR.
ALAN J. MIKESKA
BY Harry A. Herbert Jr
and
Arsen Tashjian
ATTORNEYS

FREE-FLOATING ROCKET NOZZLE INSERT

BACKGROUND OF THE INVENTION

This invention relates to a pyrolytic graphite coated rocket nozzle insert and, more particularly, to a method of mounting the insert in such a manner so as to protect it from failure by cracking and delamination of the pyrolytic graphite coating.

Some conventional rocket motors have a nozzle which is of a composite structure. That is, the nozzle is built up, or composed, of a number of nozzle inserts. The individual inserts of this plurality of inserts may be, and usually are, made of different materials. The principal purpose of such a composite structure is to attain certain thermal and mechanical properties which are not obtainable if one material in one piece comprises the nozzle in its entirety. In this connection, one type of a conventional rocket nozzle insert is prepared by coating a suitable substrate material with pyrolytic graphite (hereinafter referred to as PG), which has a laminar structure, at the gas flow interface. The insert is conventionally annular shaped and has a central axis which coincides with the longitudinal axis of the nozzle proper.

The basic problem is that during rocket motor firings stresses are developed in rocket nozzle inserts which may cause failure of the inserts by cracking and delamination of the PG coating.

My inventive concept, a method of mounting a typical nozzle insert in the total nozzle structure, minimizes the development and effect of the motor firing stresses; and thereby significantly advances the art by preventing cracking and delamination of the PG coating of the insert.

SUMMARY OF THE INVENTION

This invention relates to a PG coated rocket motor nozzle insert and, more particularly, to a method of mounting the insert in a composite-type rocket nozzle.

The principal object of this invention is to prevent failure of the nozzle insert by cracking and delamination of the PG coating.

This principal object, and still other objects and related ones, of this invention will become readily apparent after a consideration of the description of the invention and reference to the drawing.

DESCRIPTION OF THE DRAWING

The drawing is a side elevation view, in cross-section and in schematic form, of a conventional composite-type rocket motor nozzle assembly which embodies the invention.

DESCRIPTION OF THE PREFERRED EMBODIMENT

In the drawing is shown a typical rocket nozzle assembly 10, which includes: composite-type rocket nozzle 20, with component nozzle inserts 21–28; entrance 30; convergent section 31; throat section 32; divergent section 33; exit 34; and external casing 40.

Also shown in the drawing are nozzle assembly longitudinal axis A-B and, as indicated by arrows, the direction of gaseous flow from entrance 30 to and through convergent section 31, throat section 32, divergent section 33, and exit 34.

Still with reference to the drawing, nozzle insert 24 is selected, for illustrative purposes, as the nozzle insert to be protected by my method of mounting. With reference to nozzle insert 24, said insert has four surfaces 24A, 24B, 24C, and 24D. Three of the surfaces, i.e., entrance end face 24A, longitudinal surface 24B, and exit end face 24C are external. One surface 24D is internal and has a coating 50 of PG. The entrance end face surface 24A of insert 24 has a circumferential groove 61 formed in it by suitable means near the PG coated-internal surface interface. A similar circumferential groove 62 is formed in exit end face surface 24C. Insert 24 is bounded on three surfaces 24A, 24B, and 24C by gaps 71, 72 and 73 which are approximately 10 mils wide. Additionally, as previously stated, insert 24, as well as the other inserts, is annular shaped and has a central axis which coincides with longitudinal axis A-B of nozzle assembly 10. Further, the next adjacent insert 25 to the longitudinal periphery or surface 24B of insert 24 has an annular slot 80 formed in its longitudinal internal surface 25A. Annular slot 80 is positioned so that the ratio of the distances X to L, as shown in the drawing, is preferably 0.125, and is of a size to accept and seat O-ring 90.

DESCRIPTION OF THIS METHOD

My method of mounting a PG coated rocket nozzle insert, such as 24, in a composite-type rocket nozzle, such as 20, to prevent failure of the nozzle insert 24 by cracking and delamination of the PG coating, such as 50, includes the steps of forming, by suitable means, a circumferential groove, such as 61, in the entrance end face surface 24A of insert 24; and forming a similar circumferential groove, such as 62, in the exit end face surface 24C of insert 24. The grooves 61 and 62, are formed near the interface of surface 24D of insert and PG coating 50. Then an annular slot, such as 80, is formed by suitable means in the longitudinal internal surface 25A of the next adjacent insert 25. The preferred positioning and size of slot 80 already has been discussed and, in the interest of brevity, will not be further discussed here. Then, insert 24 is coated on external surfaces 24A, 24B, and 24C with a layer of silicon grease. O-ring 90 is, thereafter, seated within annular slot 80. Insert 24 is then positioned in its proper place in the composite-type rocket nozzle 20.

With the complete build-up of nozzle 20, insert 24 is in effect free-floating on the layer of silicon grease which fills gaps 71, 72 and 73. This free-floating condition permits sufficient movement of insert 24 to minimize stresses on insert 24. In addition, O-ring 90 balances pressures and prevents unusual stress during motor firings.

The sum total of the result achieved by this method is the protection of insert 24, the insert selected for illustrative purposes and, more specifically, the preventing of cracking and delamination of PG coating 50 of insert 24.

While there has been shown and described the fundamental features of my inventive method as applied to a particular insert, this is by way of illustration only, not by way of any limitation. Obviously, the method may be practiced on a nozzle insert of different positional relationship within the composite-type nozzle. Additionally, the method may be adapted, without patentable significance, to mount a nozzle insert of geometric configuration different than insert 24. Further, the method may be used to mount a plurality of longitudinally adjacent, entrance-end-to-exit-end positioned, inserts. Of course, if such is done, gaps would have to be formed surrounding each of the inserts to be mounted to and an O-ring would need only be used in conjunction with the mounting of the insert farthest from entrance end 30.

What is claimed is:

1. The method of mounting, in a composite-type rocket nozzle, a nozzle insert which is substantially annular in configuration and which has four surfaces, three of which are external and uncoated, including an entrance end face surface, a longitudinal surface, and an exit end face surface, and the fourth of which is internal and is coated with pyrolytic graphite, and with the pyrolytic graphite coated insert having a nozzle insert next adjacent to its longitudinal surface, comprising the steps of:

a. forming a circumferential groove in the entrance end face surface near the interface of the internal surface of the pyrolytic graphite coated insert and the pyrolytic graphite coating thereon;

b. forming a circumferential groove in the exit end face surface near the interface of the internal surface of the pyrolytic graphite coated insert and the pyrolytic graphite coating thereon;

c. forming an annular slot in the longitudinal internal surface of the insert which is next adjacent to the longitudinal surface of the pyrolytic graphite coated insert;

d. coating, with a layer of silicon grease, the external surfaces of the pyrolytic graphite coated insert;

e. seating an O-ring within the aforesaid annular slot;

f. and, positioning the pyrolytic graphite coated insert in its proper place in the composite-type rocket nozzle;

whereby the pyrolytic graphite coated insert is in a free-floating condition, and cracking and delamination of the pyrolytic graphite coating is prevented.

* * * * *